United States Patent [19]

Kitajima et al.

[11] Patent Number: 4,884,100
[45] Date of Patent: Nov. 28, 1989

[54] DENSITY MEASURING DEVICE FOR ORIGINALS IN AN ENLARGING/REDUCING PROJECTOR

[75] Inventors: Yamato Kitajima, Ramsey, N.J.; Yuji Hayashi, Osaka, Japan

[73] Assignee: Minolta Camera Kabushiki Kaisha, Osaka, Japan

[21] Appl. No.: 193,953

[22] Filed: May 13, 1988

[30] Foreign Application Priority Data

May 19, 1987 [JP] Japan ............................ 62-75694[U]

[51] Int. Cl.⁴ ...................... G03B 27/74; G03B 27/80
[52] U.S. Cl. ........................................ 355/68; 355/57; 354/481
[58] Field of Search .............. 354/481; 355/14 E, 68, 355/57, 55, 38, 246

[56] References Cited

U.S. PATENT DOCUMENTS 4,673,282 6/1987 Sogame .............................. 355/14 E
4,743,944 5/1988 Tomosada et al. ................ 355/55 X Primary Examiner—Richard A. Wintercorn
Attorney, Agent, or Firm—Price, Gess & Ubell

[57] ABSTRACT

A density measuring device for originals in an enlarging/reducing projector, which is installed in a electrophotographic copying machine or in an image sensor to measure original densities for enlarged/reduced printing under automatic exposure control. The device includes a light sensor, which receives light from an original via mirrors, and moves to keep a constant distance between the sensor and the original when the mirrors move in response to the change of projective magnification. The length of optical path for original density measurement is corrected by moving the sensor separately from but in accordance with the projection lens as the lens moves to change projective magnification.

6 Claims, 4 Drawing Sheets

DENSITY MEASURING DEVICE FOR ORIGINALS IN AN ENLARGING/REDUCING PROJECTOR

BACKGROUND OF THE INVENTION

1. Technical Field of the Invention

The present invention relates to a density measuring device for originals in an enlarging/reducing projector, which is installed in an electrophotographic printer such as a copying machine or in an image reader to measure original densities for enlarged/reduced image projecting under automatic exposure control.

2. Brief Description of the Prior Art

A conventional enlarging/reducing projector typically installed in a copying machine has a projection lens, which projects an image of an original on a document glass onto a photoconductive drum, and several mirrors which reorient the optical path of projection. Referring to FIG. 1, one type of the projector corrects the conjugate length of projection by moving not only the projection lens but also the mirrors which are closer to the original than the projection lens in terms of optical path, when enlarged/reduced image projecting is requested.

In such an enlargement/reduction projector, a light sensor for originals is often fixed near the projection lens so that it may receive light from the original through the mirrors for the purpose of original density measurement; the original density should be known if automatic exposure control is desired.

However, the light sensor receives light from the original through mirrors which move according to enlargement/reduction requests, and thus, the distance between the sensor and the original changes in terms of optical path when the projective magnification is changed from one to another.

The light sensing area determined by an original when the printed image is to be as large as the original one (a same-size magnification), differs from that determined when the printed image is to be a reduction of the original one (a reduced magnification). The variation in light sensing area is attributed to the convergent width of the paths. FIG. 2 is a schematic view showing measuring regions of a sensor H which is fixed in position regardless of projective magnification. In FIG. 2, a measuring region of an original $I_1$ in the same-size magnification (shown by solid line) is different from that of an original $I_2$ in the enlarged/reduced magnification (shown by dot line) by an amount of S1 S2, because of constant sensing angle of the sensor H. Therefore, the light sensor cannot detect meaningful original densities due to the inconstant length of the optical path between the sensor and the originals and to the inconstant light sensing area among differently magnified projections, that is, automatic exposure control loses its accuracy. This phenomenon is generally observed in all kinds of density measuring devices for originals in enlarging/reducing projectors that detect densities through mirrors which move according to enlargement/reduction requests.

SUMMARY OF THE INVENTION

A density measuring device for originals according to the present invention overcomes the disadvantage discussed above with the following features.

The main object of this invention is to provide a density measuring device which gives comparable densities so that exposure may be controlled automatically throughout an operation when enlargement/reduction is requested and the density measuring condition is changed.

The foregoing is accomplished in the embodiment of the invention by moving the light sensor in accordance with the mirror movement in such a way that the length of the optical path from the original to the sensor via the mirrors is always constant, where the mirror moves as well as the projection lens in order to correct the length of the optical path when the projective magnification is changed, and the light sensor receives light from the original through the prementioned moving mirrors just as the same as the conventional enlargement/reduction projectors. The length is kept constant by moving the sensor separately from but in accordance with the projection lens. Thus, the original density detection is conducted under constant length of optical path and constant light sensing area regardless of projective magnification.

Further features and advantages of the invention will be better understood by reference to the following description, and to the drawings forming a part thereof.

BRIEF DESCRIPTION OF THE DRAWINGS

FIG. 3 is a cross-sectional view of the entire electrophotographic copying machine in which an enlarging/reducing projector may be installed.

FIG. 4 is an isometric view of the part of the copying machine which can change projective magnification.

FIG. 5 is a plane view of a length correcting mechanism of an optical path determined by movable mirrors, which function in accordance with the variation in projective magnification.

FIG. 6 is a partial view of the mechanism.

FIG. 7 is a plane view of the light paths showing two different conditions under different projective magnification.

DETAILED DESCRIPTION OF THE INVENTION

Figure 1:
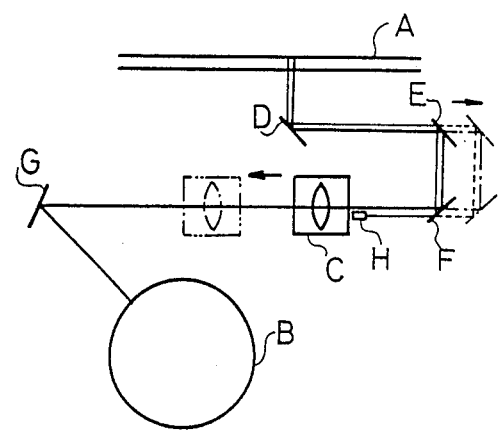
FIG. 1 shows a structure of a conventional projector.
Figure 2:
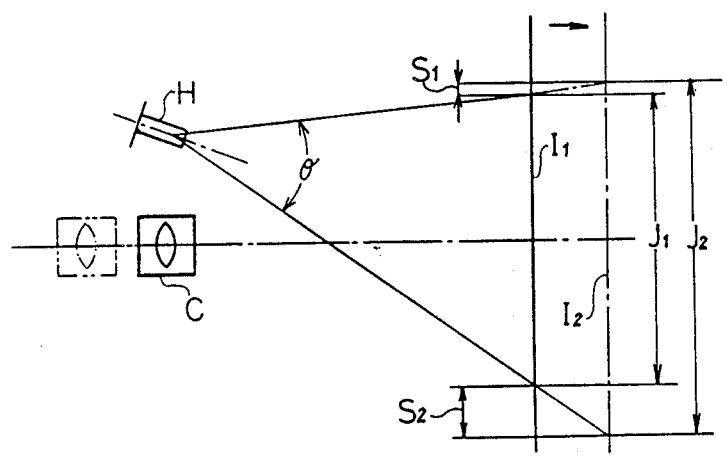
FIG. 2 is a schematic view showing measuring regions of a sensor fixedly installed in the projector shown in FIG. 1.
Figure 3:
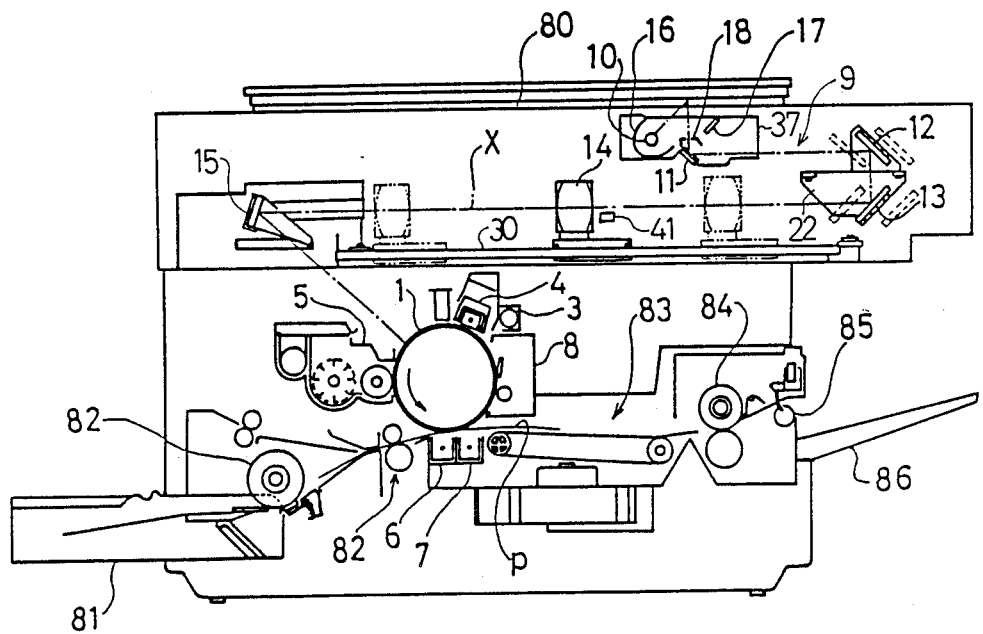
FIGS. 3 through 7 illustrate one preferred embodiment of the present invention, which is installed in an electrophotographic copying machine of a mirror scanning and of variable projective magnification type.

Appreciation of the fundamental principles of this invention is possible with a clear understanding of a typical mechanism of an electrophotographic copying machine and that of an enlarging/reducing projector installed in such a copying machine. As can be seen in FIG. 3, a photoconductive drum 1 which rotates counterclockwise is disposed approximately in the middle of the main body of the copying machine. Around the drum 1 are an eraser lamp 3, a charger 4, a developing device 5, a transferring charger 6, a separating charger 7, and a cleaner 8. The photoconductive drum 1 is charged by the charger 4, and then, exposed by an illumination unit 9 to form an image. The illumination unit 9 consists of an illumination lamp 10 as a light source, illumination mirrors 16, 17, a slit 18, a first movable mirror 11, a second movable mirror 12, a third movable mirror 13, a projection lens 14, and a mirror 15, and is disposed under the document table 80 in order to scan the originals.

The photoconductive drum 1 moves at a circumferential velocity of v while the lamp 10 and the first movable mirror 11 move to the left in the figure at a velocity of v/n where n is projective magnification and the second and third movable mirrors 12, 13 move to the left at a velocity of v/2n, so that the length of optical path would be kept constant. In addition, the projection lens 14 moves along the optical axis X and the conjugate length determined by the second and the third movable mirrors are corrected when projective magnification is changed.

At the same time, papers stacked in a cassette 81 are fed to the main body of the copying machine by a feeding roller 82, synchronized with the images on the photoconductive drum 1 by a timing roller 82, have the images transferred on, goes through a conveying path 83 to let the images be fixed by a fixing roller 84, and then discharged to a tray 86 by a discharging roller 85.

Figure 4:
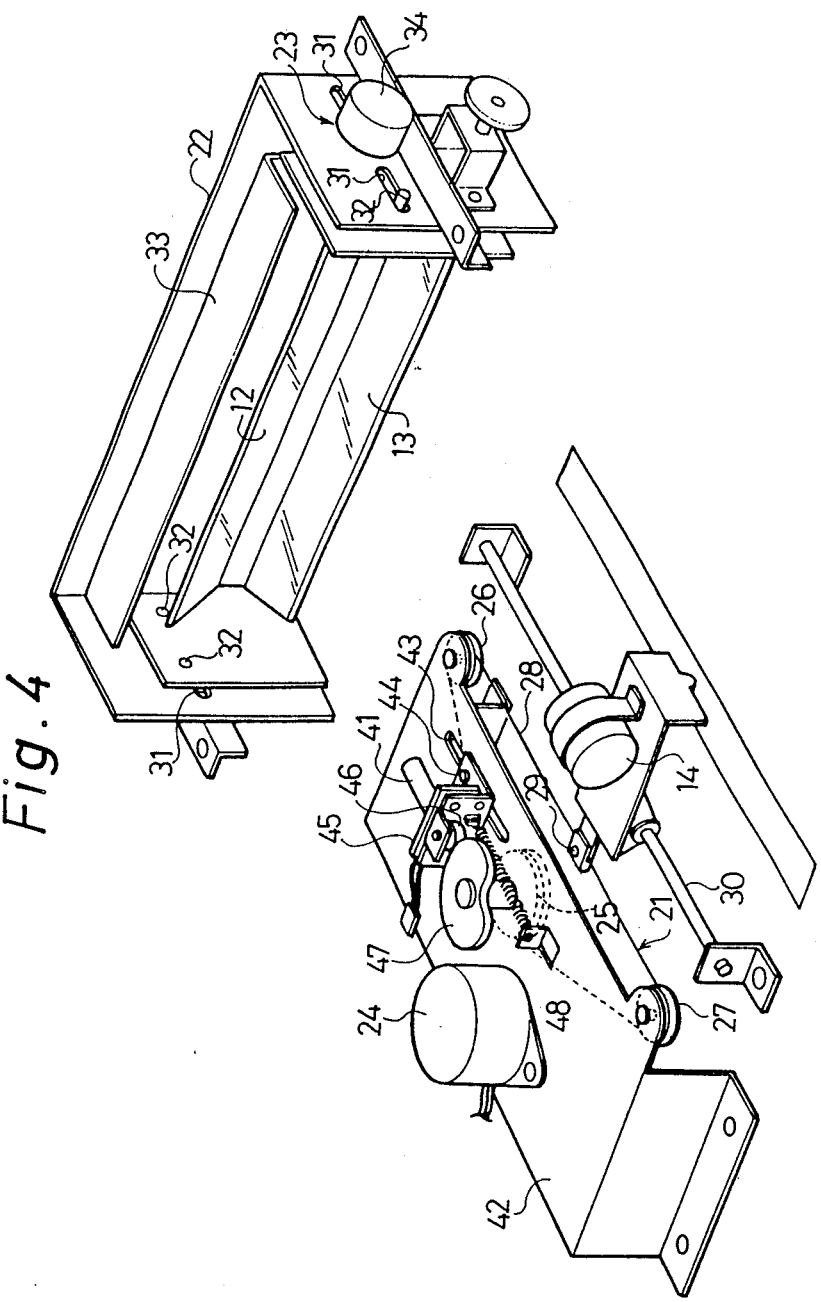

Referring particularly to FIGS. 3 through 6, there is illustrated a device to change projection to any magnification, whether enlargement or reduction, which is installed in a copying machine such as the one described above. As shown in FIG. 4, the device comprises a lens moving mechanism 21 which moves the projection lens 14 and a mirror moving mechanism 23 which moves the second and the third movable mirrors 12, 13 relative to a scanner moving table 22. The lens moving mechanism 21 has a driving pulley 25 in the middle which is linked to a stepping motor 24. They may be linked through a gear or through others. A wire 28 is strung between two guide rollers 26, 27 and the driving pulley 25, which is further linked to the projection lens 14 by a rivet 29. Therefore, projective magnification is changed by moving the projection lens 14 along the guide bar 30 toward the optical axis as much as the wire 28 is driven by the motor 24.

Figure 5:
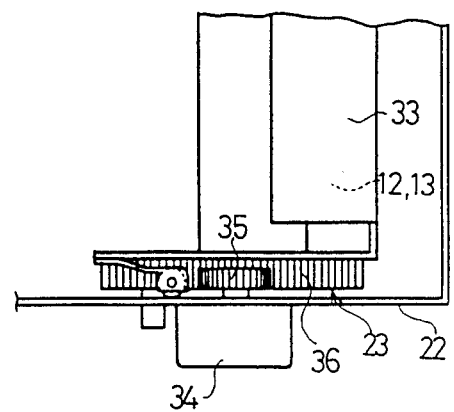
Figure 6:
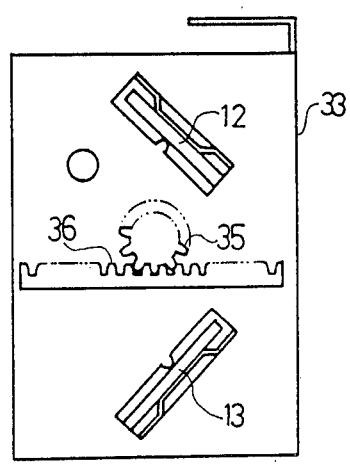

The mirror moving mechanism 23 has a moving table 22 to move the second and the third movable mirrors when scanning light from an original. The table 22 holds a holder 33 of the second and the third movable mirrors 12, 13 by pins 32 which penetrate slits 31 so that the holder may move toward the optical axis. There is a stepping motor 34 fixed to the moving table 22, and further to this motor is fixed a pinion 35, as shown in FIGS. 5 and 6. The pinion 35 is geared into a rack 36 which is fixed to the holder. The holder 33 is moved along the moving table 22 in proportion to the rotation of the pinion 35 by the motor 34; the holder is fixed to the place where it was moved by the motor through the pinion until the motor starts driving again.

In such a device, the second and the third movable mirrors 12, 13 move together with their holder 33, and thus, it is the correction of the conjugate length of projection through moving the mirrors, which is changed by the movement of the projection lens 14 in accordance with the variation in projective magnification, that is conducted. The moving table 22 itself also moves for scanning, and the movement is accomplished by linking the table 22 and another moving table 37 which supports the first movable mirror 11 and the lamp 10 and so on to a wire which is driven by a motor and is not shown in the figure. Therefore, although the second and the third movable mirrors 12, 13 are moved along the moving table 22 to the position determined by each projective magnification for the purpose of the conjugate length correction, scanning by the mirrors 12, 13 is proceeded at the favorable position determined by the movement of the moving table 22 itself; the conjugate length correction and the scanning do not interfere with each other.

Generally, a light sensor 41 in a photocopying machine is disposed near the projection lens 14 for original density measurement, and receives light from the original via the third, the second and the first movable mirrors 13, 12, 11. The measured original density is informed to automatic exposure control means (which may be one of the functions of a microcomputer for behavior control) not shown in the figure in order to control the illumination lamp 10 voltage in accordance with the original density and to properly expose an image of the original onto the photoconductive drum.

Figure 7:
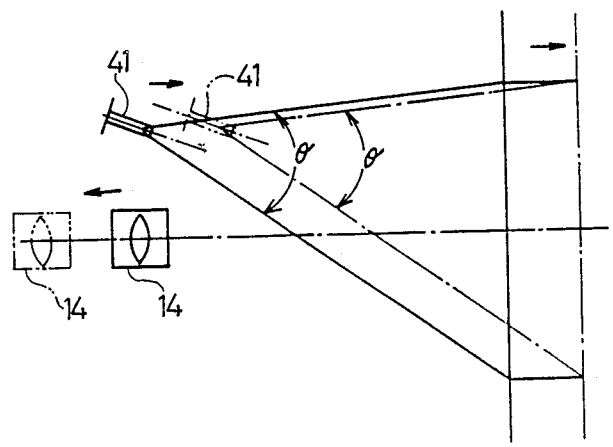

The light sensor 41 of this invention is fixed to a moving table 45 by a pin 44 which penetrates a slit 43 of a table 42 and is movable toward the optical axis. A cam follower 46 located on the moving table 45 is pressed by a spring 48 to touch a cam 47 which is directly connected with the driving pulley 25. The cam 47, therefore, rotates and moves the moving table 45 through the cam follower 46, when the projection lens 14 is moved to change the projective magnification. Moreover, the movement of the projection lens 14 to change the projective magnification induces the movement to correct the optical path length of light measurement; the light sensor 41 which is fixed on the moving table 45 is moved twice as much and in the same direction as the second and the third movable mirrors 12, 13. This is based on the fact that the length of optical path changes twice as much as the moved distance of the second and the third movable mirrors 12, 13. In other words, although the mirrors 12, 13 may move to correct the conjugate length when the projective magnification is changed, the length of optical path of the light which the light sensor 41 receives from the original via the mirrors 12, 13 is kept constant, and therefore, the light sensing area also does not change. This is shown in FIG. 7; a broken line (--) shows the light path under magnification smaller than that of shown by a solid line.

While the present invention has been described in connection with a certain specific embodiment, it is to be understood that it is not to be limited to this embodiment. For example, the light sensor 41 may be linked with the mirror moving mechanism 23 instead of the lens moving mechanism 21 so that the sensor 41 may move twice as much as the mirror moving mechanism 23. Or, the lens and the mirror moving mechanisms 21, 23, and the light sensor 41 may be combined, and all may be driven by one motor. In addition, not only cams but also gears, levers, and wires can link the above mechanisms and the sensor. It will be appreciated that various other alternatives, modifications, variations or improvements thereon may be made by those skilled in the art, and the following claims are intended to encompass all of those falling within the true spirit and scope of the invention.

What is claimed is:

1. A density measuring device for originals in an enlarging/reducing projector comprising:
   a light sensor which detects original density by light from an original via mirrors in order to automatically control image exposure;
   means for correcting an optical path of projection when a projective magnification is changed; and
   means for moving the sensor separately from a projection lens when the projective magnification is changed.

2. The density measuring device for originals of claim 1 wherein:
   the means for correcting the optical path of projection moves mirrors as well as projection lens when the projective magnification is changed.

3. The density measuring device for originals of claim 2 wherein:
   the sensor moving means moves the sensor so that the length of the optical path and light sensing area of original density are kept constant regardless of projective magnification.

4. A density measuring device for originals in an enlarging/reducing projector comprising:
   means for correcting an optical path of projection between the original and a projective lens when a projective magnification is changed;
   a light sensor which detects original density by light from an original via mirrors and is disposed near the projective lens; and
   means for moving the sensor separately from the projective lens when the projective magnification is changed.

5. The density measuring device for originals of claim 4 wherein:
   the means for correcting optical path of projection moves mirrors as well as projection lens when projective magnification is changed.

6. The density measuring device for originals of claim 5 wherein:
   the sensor moving means moves the sensor so that the length of the optical path and the light sensing area of original density measurement are kept constant regardless of projective magnification.

* * * * *